United States Patent

Shellhause

[11] 4,041,449
[45] Aug. 9, 1977

[54] FAILURE WARNING SWITCH ACTUATOR WITH AUTOMATIC RESET

[75] Inventor: Ronald L. Shellhause, Vandalia, Ohio

[73] Assignee: General Motors Corporation, Detroit, Mich.

[21] Appl. No.: 678,910

[22] Filed: Apr. 21, 1976

[51] Int. Cl.² .......................................... B60T 17/22
[52] U.S. Cl. ........................... 340/52 C; 200/82 D; 303/6 C
[58] Field of Search ............ 340/52 C, 242; 303/6 C; 200/82 D

[56] References Cited

U.S. PATENT DOCUMENTS

| 3,480,333 | 11/1969 | Stelzer | 303/6 C |
| 3,606,486 | 9/1971 | Doerfler | 303/6 C |
| 3,674,954 | 7/1972 | Kish et al. | 200/82 D |
| 3,733,106 | 5/1973 | Rike et al. | 303/6 C |
| 3,810,142 | 5/1974 | Ito | 340/242 |

Primary Examiner—Alvin H. Waring
Attorney, Agent, or Firm—D. D. McGraw

[57] ABSTRACT

A dual circuit brake system has a failure warning section in which the pressures in each of the circuits are sensed by a pair of pistons having a switch actuating shuttle positioned between the pistons by a pair of springs. The ends of the shuttle are telescoped in the pistons for guidance and relative movement. The switch pistons are relatively small with little travel, minimizing displacement loss. The centering springs do not have sufficient load to force the shuttle to the off position once failure in one system has occurred and the pressure in the remaining system has been released. Repair of the failed system allows pressure actuation to move the shuttle back to the deactuated position for automatic reset.

4 Claims, 4 Drawing Figures

FAILURE WARNING SWITCH ACTUATOR WITH AUTOMATIC RESET

The invention relates to a brake failure warning system and more particularly to a switch actuator arrangement which provides for automatic reset. In the preferred form of the invention, when the sensed circuit pressures are normally equal, the switch actuator pistons which sense the pressures in the two brake circuits are of the same diameter and contained in a straight bore section having a common diameter throughout the failure warning section.

The switch actuating mechanism includes a pair of opposed pistons which are cup-like in shape, the recesses in the pistons facing each other. Between the pistons is placed a switch actuating shuttle, the shuttle having its opposite ends in telescoping engagement with the pistons. Light weight return springs are contained in each of the pistons, each spring acting on one end of the shuttle and one of the pistons so as to normally urge the pistons apart. Suitable stops are provided at the ends of the bore in which the pistons normally reciprocate. The shuttle is provided with a pair of axially spaced ramps which are engaged in a camming arrangement by a switch plunger spring loaded to maintain such engagement. So long as the shuttle is maintained substantially centered in the bore, the plunger does not engage and move up either of the ramps, and the switch remains in the off position. However, should the shuttle be moved axially a sufficient distance, the plunger will engage and ride up one of the ramps, actuating the switch. This occurs when one of the pressures acting on one of the pistons drops to a level substantially lower than the pressure acting on the other piston. Each of the pistons is provided at its inner end with a ramp and shoulder, the ramp aligning with the ramp of the shuttle upon failure of one circuit, and preventing the plunger from riding over the shuttle ramp and down the reverse side in a locking position until the brake circuit remaining pressurized has been released. Upon such release, the piston will move away from the shuttle ramp under influence of the associated centering spring, allowing the switch plunger to move downwardly on the reverse side of the shuttle ramp and locking the shuttle in a leftward or rightward position, locking the switch in an actuated position. When the failed circuit is repaired and the brake system is again actuated, both brake circuits have pressure generated therein. The pressures acting against the pistons move both pistons toward the center of the bore, and the piston which is exposed to the pressure in the formerly failed circuit moves further, causing the shuttle to return to its center position, the switch actuating plunger riding up over the shuttle ramp and returning to the off position.

The switch actuator may be incorporated in a housing of its own when only the failure warning function is desired. It may also be incorporated in a combination valve assembly similar to the valve assembly disclosed in U.S. Pat. No. 3,709,563, for example. Such combination valves often have a metering valve in the front brake circuit and may have a proportioning valve in the rear brake circuit.

Figure 1:
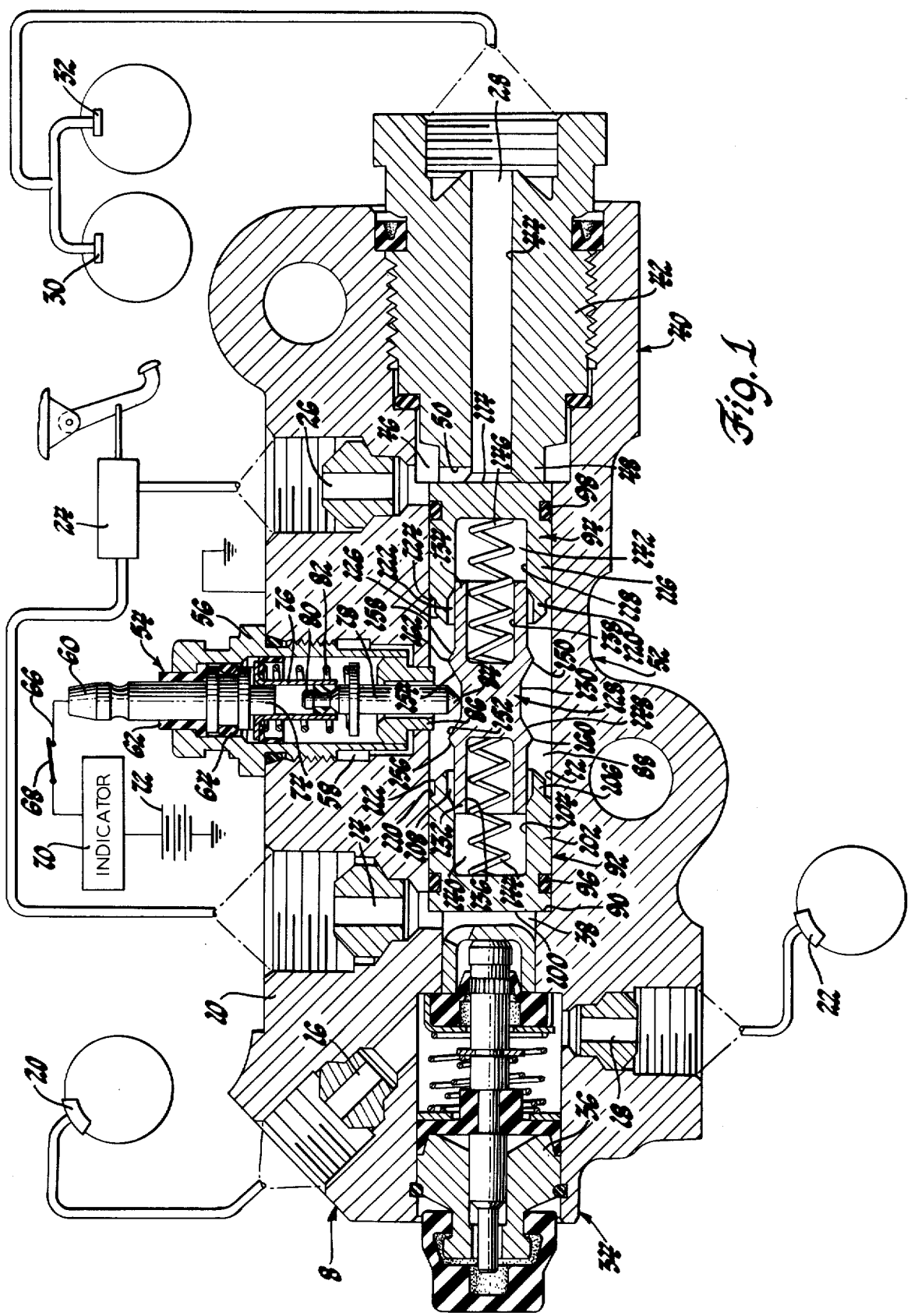
FIG. 1 is a cross section view of a combination valve assembly having the failure warning switch actuator embodying the invention installed in the failure warning section of such a valve. The figure includes a schematic illustration of a vehicle brake system.

The assembly 8 includes the mechanism embodying the invention as a part of a combination valve. It is schematically shown in a dual circuit vehicle braking system. The assembly housing 10 is provided with a through bore 12 having several shoulders thereon and divided into several chambers as will be described. The front brake pressure inlet 14 connects with a left center portion of the bore 12, and outlets 16 and 18 connect with the left end portion of the bore 12. These outlets are connected to the two front disc brakes 20 and 22 of the vehicle. The rear brake pressure from the master cylinder 24 passes through inlet 26, connected to the right center portion of the bore 12, and the outlet 28 at the right end of the bore 12 is connected to the rear brakes 30 and 32.

The left portion 34 of the assembly comprises the metering section, which prevents initial front disc brake pressure buildup until the rear brake shoes contact the drums. The pressure thus held off is then admitted to the front brakes at higher input pressures.

The metering valve 36 functions to delay pressurization of the front disc brakes 20 and 22 until sufficient pressure has been delivered to the rear drum brakes to move the rear brake shoes into contact with their associated brake drums. The metering valve is completely described in the above-noted patent, and reference may be made to that patent if desired. Since the metering valve does not form a part of the invention herein disclosed and claimed, it is considered sufficient to point out that the brake supply pressure for the front brake circuit enters the housing 10 through inlet 14 and is always present in chamber 38 of bore 12. The pressure is acted upon by the metering valve 36 and is distributed to the front brakes through outlets 16 and 18.

The right portion 40 of the assembly 8 is the portion that may have a proportioning valve installed if the rear brake pressure is to be proportioned. Since the proportioning valve does not form a part of the invention herein disclosed and claimed, no proportioning valve is shown. Instead, a plug 42 is installed in the right end of bore 12. The plug has a passage 44 extending axially therethrough and continually fluid connecting the outlet 28 with the chamber 46 formed in bore 12 and in fluid communication with inlet 26. The end 48 of plug 42 at chamber 46 has a slot 50 formed radially therein to insure fluid communication between chamber 46 and passage 44.

The center portion 52 of assembly 8 includes the warning section. A switch assembly 54 has a housing 56 threaded into an appropriate opening 58 in housing 10. A terminal 60 extends outwardly and is electrically separated from housing 56 by an insulator 62 and an "O" ring 64. Terminal 60 is electrically connected in a circuit 66 containing a suitable switch 68, an indicator 70, and a source of electrical energy schematically illustrated as battery 72. Indicator 70 may be a light, bell, or horn, by way of example. The inner end of terminal 60 is formed as a pin 74 around which a metallic collar 76 is received. The collar extends downwardly beyond the end of pin 74. The upper end of a plunger 78 is formed to provide another pin 80 which is slidably mounted in collar 76 but electrically insulated therefrom. A spring 82 acting on plunger 78 normally keeps the pins 74 and 80 separated. When the plunger 78 is moved upwardly, collar 76 electrically engages plunger 78 and the switch contacts are closed. Plunger 78 is electrically connected through housing 56 to ground in order to complete the circuit. The lower end 84 of plunger 78 extends into the center portion of bore 12 through an annular portion 86 of housing 56. Annular housing portion 86 also extends slightly into bore 12, but not so far as does plunger 78.

The center portion 88 of bore 12 is a cylindrical chamber, one end of which is connected to chamber 38 at bore shoulder 90. The other end of the center portion chamber 88 opens into chamber 46. That end of chamber 88 may be considered to be defined by the end 48 of plug 42. Since the dual circuit brake system is considered to generate substantially equal pressures in both portions of the master cylinder 24 and therefore to deliver substantially equal pressures to chambers 38 and 46, the bore center portion 88 is of the same diameter throughout its axial length. A pair of pistons 92 and 94 are reciprocably mounted in the bore center section 88. Each piston is generally cup-shaped. A seal 96 on piston 92 seals against the wall defining the bore center portion 88, and a similar seal 98 in piston 94 operates in the same manner. Piston 92 has an end wall or head 100 which defines one end of chamber 38. Piston skirt 102 is cylindrically formed to provide a piston recess 104. The annular end 106 of skirt 102 is undercut at 108 at its inner periphery, and is formed at its outer periphery with a reduced diameter to define a shoulder 110. A ramp 112 provides the end face of skirt end 106. Ramp 112 forms an angle so that the inner peripheral portion of the skirt end defined by undercut 108 extends axially for a greater distance than does the outer peripheral portion thereof adjacent shoulder 110.

Piston 94 is similarly constructed, and has an end wall or head 114 which defines one end of chamber 46. Piston skirt 116 is cylindrically formed to provide a piston recess 118. The annular end 120 of skirt 116 is undercut at 122 at its inner periphery, and is formed at its outer periphery with a reduced diameter to define a shoulder 124. A ramp 126 provides the end face of skirt end 116. Ramp 126 forms an angle so that the inner peripheral portion of the skirt end defined by undercut 122 extends axially for a greater distance than does the outer peripheral portion thereof adjacent shoulder 124.

A shuttle 128 is reciprocably received in the center portion 88 of bore 12 between pistons 92 and 94. The shuttle has a center body section 130 and opposed recessed ends 132 and 134. End 132 is telescopically received in recess 104 of piston 92 and end 134 is telescopically received in recess 118 of piston 94. Recesses 136 and 138, respectively provided in ends 132 and 134, cooperate with the piston recesses to define chambers 140 and 142. A light compression spring 144 is received in chamber 140 and acts on piston 92 at the bottom of recess 104 and on shuttle 128 at the bottom of recess 136. A similar spring 146 is received in chamber 142 and acts on the bottom of piston recess 118 and the bottom of shuttle recess 138. The springs therefore act in opposition on shuttle 128 to urge pistons 92 and 94 axially away from each other. When there is no brake pressure in the brake system, the end wall 100 of piston 92 rests against bore shoulder 90 and the end wall 114 of piston 94 rests against the plug end 48. Shuttle 128 is positioned so that the center body section 130 is aligned with switch plunger 78 and engaged by the plunger end 84.

Figure 2:
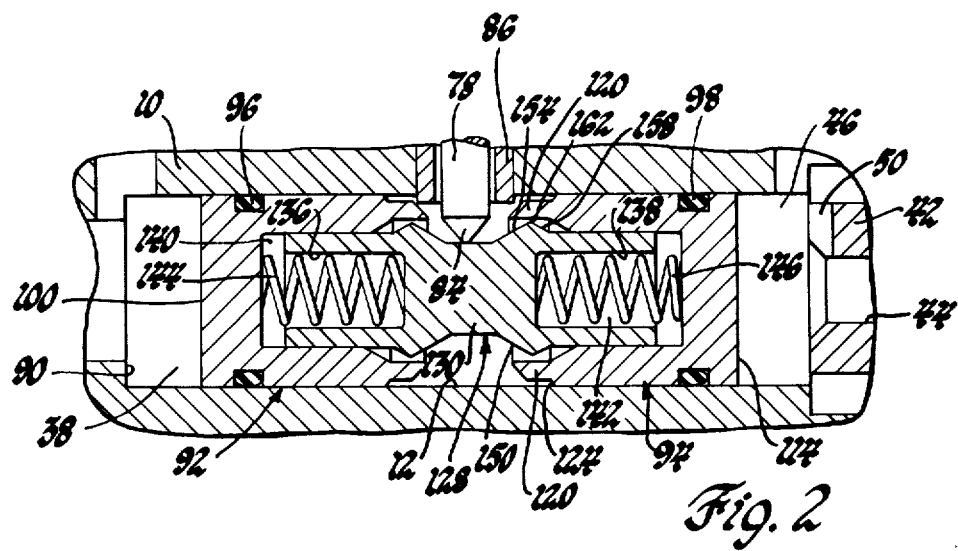
FIG. 2 is a cross section view illustrating the failure warning switch actuating portion of the combination valve assembly of FIG. 1, when both brake circuits are operating normally and pressurized.

Shuttle 128 has a pair of axially spaced and circumferentially extending ridges 148 and 150 formed thereon approximately where the shuttle ends 132 and 134 join the shuttle center section 130. The ridges 148 and 150 have their adjacent sides respectively formed as ramps 152 and 154, and their opposite sides formed as ramps 156 and 158. The diameters of the peaks 160 and 162 of ridges 148 and 150 are greater than the diameters of piston recesses 104 and 118, and of slightly less diameter than the undercuts 108 and 122. As can be seen in FIG. 2, the ridges may telescope slightly into the undercut portions of the piston skirts. When one of the ridge peaks is radially aligned with the piston skirt end, as shown in the left portion of FIG. 2, for example, ramp 112 provides a substantial continuation of ramp 152, although at a slightly different angle. A similar relationship is established for ramps 126 and 154.

The system is illustrated in FIG. 1 as having the brakes in the released condition of operation. There is therefore no brake pressure in chambers 38 and 46. When the brakes are applied by actuation of master cylinder 24, brake supply pressures are created in the conduits leading from the master cylinder to inlets 14 and 16. These pressures are substantially equal, and act on the equal but opposite areas of piston end walls 100 and 114. When the brake circuits are in good operating order, the pressures increase at substantially concurrent rates, moving pistons 92 and 94 in opposite axial directions of movement toward each other. Since the springs 144 and 146 have the same spring rates, the resistance to such movement is substantially identical. The amount of movement for each piston is therefore approximately the same. With the brake system actuated to a normal rate supply pressure level, pistons 92 and 94 will assume the relative positions shown in FIG. 2. Shuttle 128 will remain substantially centered since the opposing forces acting thereon are balanced. Upon brake release, springs 144 and 146 act on pistons 92 and 94 to return them to the position shown in FIG. 1.

Figure 3:
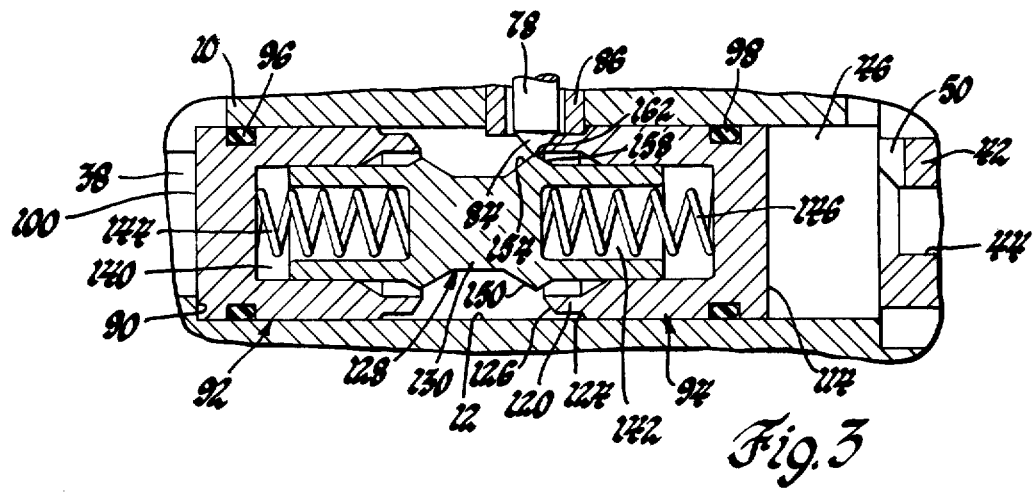
FIG. 3 is similar to FIG. 2, showing the failure warning switch actuator when the front brake circuit has lost pressure during brake actuation, the rear brake circuit retaining full braking pressure.

If during brake actuation one of the brake circuits cannot be pressurized, the mechanism will function somewhat differently. Assuming the front brake circuit to have developed a leak so that it cannot be pressurized, there will be no pressure provided in chamber 38 upon brake actuation. Piston 92 will therefore remain in engagement with shoulder 90, as seen in FIG. 3. The pressure generated in chamber 46 will act as before on piston end wall 114, moving piston 94 leftwardly. The force exerted on piston 94 will act through springs 144 and 156 and shuttle 128 against piston 92. The force is sufficient, at a predetermined pressure differential between chambers 38 and 46, to move shuttle 128 sufficiently leftward to cause ramp 154 to engage the end 84 of switch plunger 78. As the shuttle continues its leftward movement, plunger end 84 will be cammed upwardly by ramp 154 until the plunger end reaches the ridge peak 162. At this point piston 94 has moved leftwardly until shoulder 124 engages the end of switch housing annular portion 86 which extends into bore 12. The piston end 120 will move underneath the end of housing annular portion 86 so that ramp 126 will prevent the switch plunger end 84 from moving beyond ridge peak 162. The upward movement of plunger 78 will close the contacts of switch assembly 54 and energize the indicator 70. It will remain energized as long as the plunger end does not move back to the center portion 130 of shuttle 128 between ramps 152 and 154.

Figure 4:
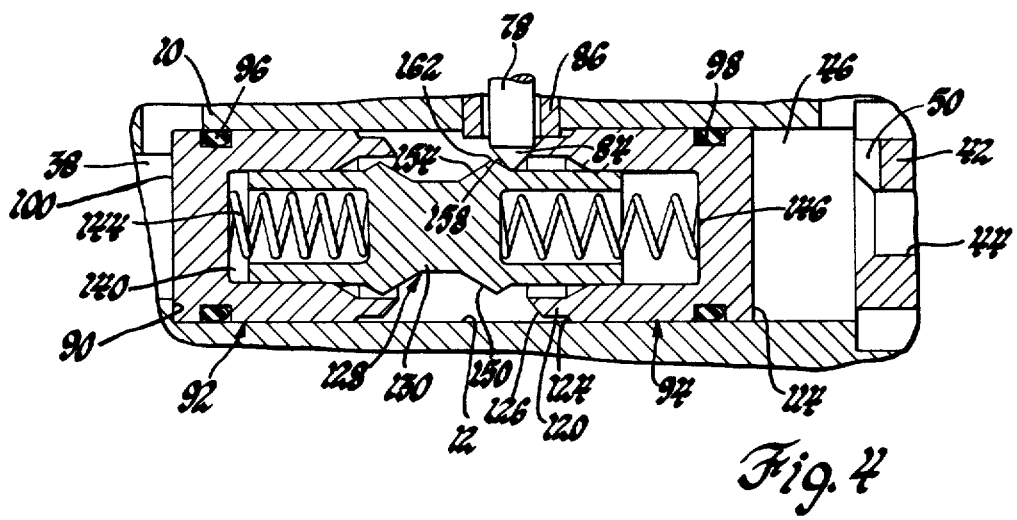
FIG. 4 is similar to FIG. 3, showing the failure warning switch actuator after the brake system has been released, locking the switch actuator in the switch "on" position.

When the brake system is released, with the mechanism in the position shown in FIG. 3, the force of spring 146 and camming action of plunger end 84 acting on piston ramp 126 will cause the piston 94 to move rightwardly as pressure decreases in chamber 46. The plunger end 84 can then move downwardly along ramp 158 of ridge 150 until the mechanism is in the position shown in FIG. 4. The diameter of shuttle cylindrical end 134 is sufficiently greater than the diameter of the center portion 130 between the ramps to keep the switch assembly 54 closed and therefore keep the indicator circuit energized unless switch 68 is opened. Switch 68 may be the ignition switch of the vehicle. By keeping the plunger 78 on the far side of ridge 150 from ramp 154, the shuttle is held in the position shown in FIG. 4 even after brake pressure is fully released. Piston 94 will move to the right under the force of spring 146 until the spring no longer exerts sufficient force to move the piston any further. When the mechanism is in this condition, indicator 70 is always energized while the switch 68 is closed. It will therefore continually warn the operator of a brake circuit malfunction so long as switch 68 is closed.

Upon repair of the front brake circuit, followed by actuation of the brake system, pressures which are substantially identical will again be generated in both circuits and exerted in chambers 38 and 46. While piston 94 will tend to move leftwardly quickly upon initial actuation of the brake system, it will be stopped when shoulder 124 engages switch housing portion 86. The piston ramp 126 will also forcibly engage switch plunger end 84, camming the plunger upwardly to the position shown in FIG. 3. Meanwhile, the force acting on piston 92 due to the pressure increase in chamber 38 will move that piston rightwardly against spring 144 and shuttle 128, forcing the shuttle to move rightwardly so that the switch plunger end 84 will be in camming engagement with ramp 154. The shuttle will then be moved rightwardly further since there is no more resistance to its movement than is normally the case when both circuits are operative. In fact, the camming action of switch plunger end 84 on ramp 154 will tend to encourage this movement. Shuttle 128 will therefore be moved back to the position illustrated in FIG. 2, and pistons 92 and 94 will be moved to their positions illustrated in that figure. The mechanism is therefore unlatched and automatically reset upon brake system actuation after the failed circuit has been repaired.

This provides a simpler construction for failure warning indication with automatic reset than constructions which utilize stepped center bore sections with different sized shuttle piston ends and collars for automatic reset purposes. This permits a single diameter center bore section and the use of identical actuating pistons 92 and 94 when both brake circuits generate the same pressures. In instances where stepped bore type master cylinders may be used to generate differing front and rear brake pressures, an inversely stepped bore center section would have to be provided, and the areas of the end walls 100 and 114 of pistons 92 and 94 would have to be changed accordingly. Thus the higher pressure chamber would have the lower piston end wall area, and the lower pressure chamber would have the higher piston end wall area, so that the opposing forces on the two pistons would still be generated at substantially equal strengths and in opposite directions.

What is claimed is:

1. A dual pressure circuit failure warning actuator comprising:

a cylinder having a center section and end sections and adapted to receive pressure from one pressure circuit in one end and pressure from the other pressure circuit in the other end;

first and second pistons reciprocably received in said cylinder in axially spaced relation, each of said pistons having an end wall adapted to be acted upon by one of the pressures to urge said pistons toward the cylinder center;

a shuttle member reciprocably received in said cylinder axially between said piston end walls and having failure warning actuating means operable to actuate a failure warning device upon a predetermined movement of said shuttle member in either axial direction from a center position in said cylinder in response to a predetermined pressure differential across said pistons, and shuttle member latching means including said actuating means and adapted to latch said shuttle member to prevent recentering movement after it has been moved said predetermined amount in one axial direction;

a pair of centering springs with one acting on each side of said shuttle member and on one of said pistons to continually urge said pistons toward said cylinder ends and said shuttle member to its center position;

and means on and including said pistons adapted to act to overcome the latching of said shuttle member latching means and to return said shuttle member to its center position by movement of said pistons toward said cylinder center section by substantially equal forces generated when both pressures concurrently increase to a predetermined pressure level.

2. A failure warning switch actuator for comparing pressures in separate brake circuits of a vehicle braking system and actuating a warning signal when one of the pressures is sufficiently less than the other to indicate a failure in one of the brake circuits, said actuator comprising:

a housing having a bore therein receiving one brake circuit pressure at one end and the other brake circuit pressure at the other end;

first and second pistons reciprocably received in said bore in sealing relation therewith and in axially spaced relation, each of said pistons having an end wall acted on by one of the brake circuit pressures and a cylindrical recess opening toward the other piston;

a shuttle received in a normally centered position in said bore between said pistons for relative axial movement thereto and having cylindrical ends reciprocably received respectively in said piston cylindrical recesses, said shuttle having switch operating means adapted for actuating a failure warning signal upon a predetermined amount of axial movement of said shuttle from said centered position;

and first and second springs respectively in said first and second piston cylindrical recesses and acting on said shuttle in opposite relation tending to keep said shuttle in said centered position in said bore between said pistons and urging said pistons in opposite axial directions in said bore;

said pistons moving axially substantially equidistantly against said springs when said pressures are increasing substantially equally upon vehicle braking system actuation, thereby imparting insufficient axial movement to the switch operating means of said shuttle to actuate said warning signal, said shuttle and one of said pistons moving against said springs to move said shuttle said predetermined amount when the brake circuit pressure acting on the other of said pistons is sufficiently less than the pressure acting on the one piston to indicate a failure in one of the brake circuits, thereby facilitating the actuation of the failure warning signal.

3. In a brake system for a vehicle having first and second separate brake sub-systems;

brake system pressure loss indicating means for providing a signal in response to pressure loss in either of said brake sub-systems, said indicating means comprising pressure responsive means including a cylindrical bore having a pair of spaced pistons with a shuttle therebetween normally axially centered in the bore and on which said pistons are piloted and reciprocably movable, a pair of springs each acting on said shuttle and one of said pistons and tending to axially expand said pressure of responsive means, and warning signal control means responsive to a predetermined axial movement of said shuttle from its normally axially centered position to actuate a warning signal, said pistons providing first and second opposed effective areas respectively responsive to the pressures in said first and second brake sub-systems in one condition of said pressure responsive means to move said pistons substantially equidistantly axially toward each other against said springs in response to the increasing pressures in both said sub-systems being approximately normal so that said shuttle has no substantial axial movement from its normally axially centered position, said pressure responsive means being actuated to another condition in response to pressure loss in either but only one sub-system below the approximately normal sub-system pressures to cause the predetermined axial movement of said shuttle to actuate the warning signal control means, said pressure loss permitting the one of said pistons responsive thereto to be moved by the one of said springs acting thereon axially away from the other of said pistons, the subsequent pressure decrease upon brake system deactivation permitting the other of said springs acting on the other of said pistons to move said other piston axially away from said one piston;

and latching means enabled by the last described movement of said other piston to latch said shuttle against axial centering movement to hold the signal control means in the actuated condition;

said one piston being movable axially relative to said suttle and toward said other piston upon restoration of normal increasing pressures in both of said brake sub-systems to engage and then move said shuttle and overcome said latching means, causing and permitting return of said shuttle to its normally axially centered position where said signal control means is returned to its warning signal deactuated condition.

4. A brake system failure warning switch actuator having a normal condition when the opposed pressures from separate brake system circuits are substantially equal, a switch actuating condition when the opposed pressures are substantially unequal, and a switch holding condition following said switch actuating condition and holding the failure warning switch actuated upon the release of the higher of the unequal opposed pressures, said actuator comprising:

a pair of opposed axially spaced equal area pistons reciprocably mounted in a bore having the pressures from separate brake system circuits imposed at opposite ends and each acting on one of said pistons, a shuttle telescopically received in and between said pistons in relative axially movable relation to said pistons and said bore, oppositely acting springs in said bore each acting on said shuttle and one of said pistons and tending to keep said shuttle axially centered between said pistons and in said bore, a cam plunger reciprocably mounted to extend radially into said bore and biased to engage said shuttle in cam following relation, a cam formed on said shuttle and engaged by said cam plunger and acting upon movement of said shuttle and said pistons from said normal actuator condition to said switch actuating condition to move said cam plunger to said switch actuating condition, blocking means on the one of said pistons acted on by the higher of the unequal opposed pressures preventing the bias force on said cam plunger from acting on said cam to further move said shuttle away from the normal condition while the pressures remain substantially unequal, said blocking means and said one piston being moved by the associated one of said opposed springs upon release of the higher pressure to permit the bias force on said cam plunger to move said cam plunger and said shuttle to the switch holding condition by over-center camming action to hold said switch actuated, the other of said pistons upon reinstatement of substantially equal braking pressures during brake system actuation forcing said shuttle back to its normal condition by overriding the cam plunger bias force, returning the actuator to its normal condition.

* * * * *